US011080376B2

(12) United States Patent
Modarresi

(10) Patent No.: US 11,080,376 B2
(45) Date of Patent: Aug. 3, 2021

(54) ANONYMOUS CROSS-DEVICE, CROSS-CHANNEL, AND CROSS-VENUE USER IDENTIFICATION USING ADAPTIVE DEEP LEARNING

(71) Applicant: ADOBE INC., San Jose, CA (US)

(72) Inventor: Kourosh Modarresi, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 341 days.

(21) Appl. No.: 16/203,392

(22) Filed: Nov. 28, 2018

(65) Prior Publication Data

US 2020/0167448 A1 May 28, 2020

(51) Int. Cl.
*G06F 21/31* (2013.01)
*H04L 29/08* (2006.01)
*G06N 3/08* (2006.01)
*G06K 9/62* (2006.01)

(52) U.S. Cl.
CPC ......... *G06F 21/316* (2013.01); *G06K 9/6227* (2013.01); *G06N 3/082* (2013.01); *H04L 67/22* (2013.01)

(58) Field of Classification Search
CPC .... G06F 21/316; G06K 9/6227; G06N 3/082; H04L 67/22
USPC .......................................................... 726/7
See application file for complete search history.

(56) References Cited

U.S. PATENT DOCUMENTS

| 8,676,804 | B1 * | 3/2014 | Janos | G06F 16/958 |
| | | | | 707/737 |
| 10,037,417 | B1 | 7/2018 | Modarresi | |
| 2017/0046735 | A1 | 2/2017 | Koh et al. | |
| 2017/0140023 | A1 * | 5/2017 | Modarresi | G06F 16/285 |
| 2017/0161761 | A1 | 6/2017 | Koh et al. | |
| 2018/0225714 | A1 * | 8/2018 | Lewis | G06Q 30/0269 |

(Continued)

OTHER PUBLICATIONS

Modarresi, K., & Diner, J. (Jun. 2018). An Efficient Deep Learning Model for Recommender Systems. In International Conference on Computational Science (pp. 221-233). Springer, Cham.

(Continued)

*Primary Examiner* — Michael S McNally
(74) *Attorney, Agent, or Firm* — Shook, Hardy & Bacon L.L.P.

(57) ABSTRACT

Embodiments of the present invention provide systems, methods, and computer storage media for digital user identification across different devices, channels, and venues. Generally, digital interactions of a user can reveal a pattern of digital behavior that can be detected and assigned to the user, and a classifier can be learned to identify the user. Various types of digital interaction data may be utilized to identify a user, including device data, geolocation data associated with a user device, clickstream data or other attributes of web traffic, and the like. Anonymity can be provided by only utilizing behavioral-based user data. Digital interaction data can be encoded and fed into a multi-class classifier (e.g., deep neural network, support vector machine, random forest, k-nearest neighbors, etc.), with each user corresponding to a different class. New users can be detected and used to automatically grow a deep neural network to identify additional classes for the new users.

20 Claims, 6 Drawing Sheets

(56) References Cited

U.S. PATENT DOCUMENTS

2020/0349249 A1\* 11/2020 Weston .............. G06K 9/00281

OTHER PUBLICATIONS

U.S. Appl. No. 15/814,979 to Kim et al., filed Nov. 16, 2017 and entitled "Predictive Analysis of Target Behaviors Utilizing RNN-Based User Embeddings." 36 pages.

\* cited by examiner

ANONYMOUS CROSS-DEVICE, CROSS-CHANNEL, AND CROSS-VENUE USER IDENTIFICATION USING ADAPTIVE DEEP LEARNING

BACKGROUND

As the number of people with access to the Internet has grown, online resources such as websites and software applications have become an increasingly important way for businesses, government agencies, and other entities to interact with the general public. For example, businesses routinely use websites to distribute information about products and services, conduct advertising and public relations campaigns, and transact business by receiving orders and payments. As a result, website administrators often devote substantial resources to analyze the expectations of the consumers who visit the various webpages comprising a website and seek to improve website efficacy in meeting consumer expectations. Likewise, application developers often seek to understand what consumers expect from a mobile application in order to tailor the application to fulfill consumer expectations. In yet another example, digital marketers seek to deliver offers for products, services, and content to consumers who will find the offers favorable and have a high probability of responding to the offers, and therefore seek to match offers to users in order to optimize the return/reward derived from the offers. In any of these cases, since it is becoming increasingly common for consumers to use multiple and different types of devices to access online resources, it is increasingly important to properly identify a given consumer in the course of his/her online activities in order to understand consumer behavior and deliver personalized services.

SUMMARY

Embodiments of the present invention are directed to digital user identification by performing a multi-class classification based on a digital interaction(s) associated with the user. Digital interactions of a user can reveal a pattern of digital behavior that can be detected and assigned to the user. In this regard, digital interactions can be used by a classifier to learn to identify the user. Various types of digital interaction data may be utilized, including device data, geolocation data associated with a user device, clickstream data or other attributes of web traffic, and the like. Anonymity can be provided by only utilizing behavioral-based user data as digital interaction data. The types of digital interaction data that are available for a particular digital interaction can depend on the device used by the user, the channel (e.g., a business unit within a company) with which the user interacts, and/or the venue (e.g., the company) with which the user interacts. Missing data from digital interaction data can be substituted with zeros, and/or matrix completion can be applied to fill in missing values.

Generally, digital interaction data can be encoded and fed into a multi-class classifier (e.g., deep neural network, support vector machine, random forest, k-nearest neighbors, etc.), with each user corresponding to a different class. In the case where the multi-class classifier is a deep neural network, new users can be detected and used to automatically grow the network to accommodate additional classes for the new users. For each incoming user to be identified, a corresponding digital interaction encoding can be fed into the deep neural network to compute activation values for each neuron in the output layer, and the neuron in the output layer with the strongest activation value can be determined. If the strongest activation value exceeds a threshold activation number (e.g., 0.9), the incoming user can be positively identified as the user corresponding to the class for that neuron. Otherwise, the incoming user can be considered a new user, and the deep neural network can be automatically grown by adding a neuron to the output layer with new connections to each neuron in the preceding layer. The classifier can automatically identify new users and periodically retrain and update itself (e.g., every x new users, when a threshold percentage of new users to known users occurs, every y new digital interactions added to the training dataset, when a threshold percentage of new digital interactions to total digital interactions in the training dataset, etc.), thereby avoiding a substantial expenditure of unnecessary computational resources, while providing the ability to adapt to new information.

As such, techniques described herein facilitate digital user identification across different devices, channels, and venues, and therefore provide a more complete picture of a user's digital interactions than in conventional techniques. Further, the present techniques do not require authentication or the use of cookies or other personally identifiable information, thereby providing privacy while enabling the provision of digital personalized services such as personalized content delivery. Finally, unlike conventional techniques, the digital user identification techniques described herein can identify digital interactions with previously unknown users and automatically adapt to the new information.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1:
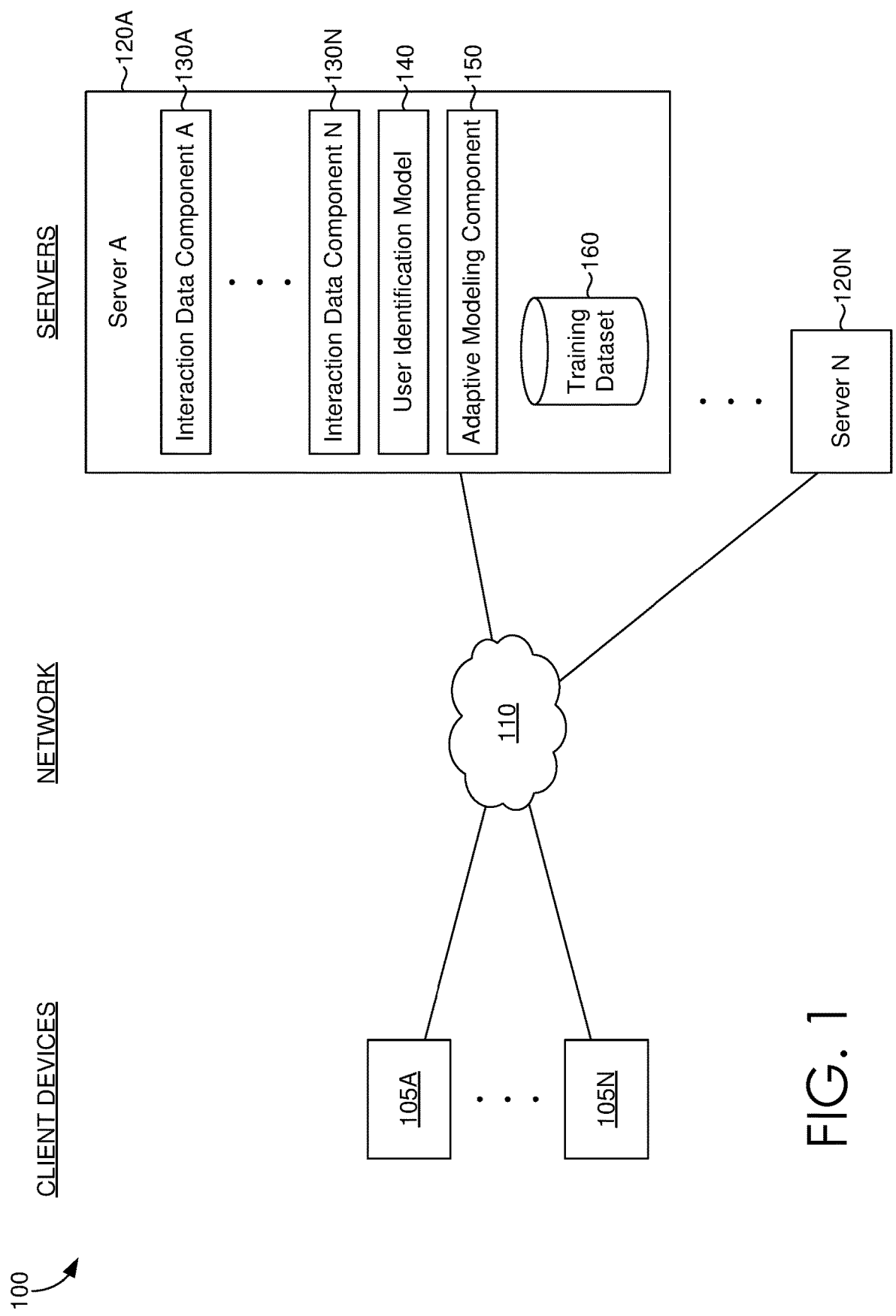
FIG. 1 is a block diagram of a digital user identification system, in accordance with embodiments of the present invention.

In order to personalize a user's digital experience during a digital interaction, an initial step is to identify the user regardless of the device used by the user. Some prior techniques rely on user authentication to identify users. However, requiring users to authenticate themselves imposes a burden which can dissuade users from interacting with a website. Similarly, users may simply choose not to log in and authenticate themselves. As a result, authentication-based techniques can provide an incomplete picture of a user's digital interactions.

In scenarios in which users interact without being logged-in, service providers commonly track cookies to identify and distinguish between different visitors who use online resources, as well as to distinguish between human and machine traffic. However, cookies change over time, can be deleted or disabled, and are different for different devices that a particular user may employ. Consequently, techniques that rely on tracking cookies often misidentify the same user as multiple users. As a result, tracking data used to analyze and make marketing decisions is incomplete, which can adversely impact digital marketing objectives, such as revenue, satisfaction, offer acceptance, and so forth.

In order to identify a user without authentication or tracking cookies, characteristics and trends about the user can be identified based on the user's digital interactions. However, users often interact with many different businesses, and through different channels of a business. As such, users' digital interactions are distributed across digital space, and valuable information about users often spans different channels (e.g., business units within a company), and/or venues (e.g., different companies). Such data is often unavailable and/or incompatible. As a result, current techniques for identifying users based on digital interactions fail to consider relevant information that can improve their accuracy.

Even for a single business evaluating its own data, it remains an open challenge to identify a user who interacts with the business using different devices. Consumers often use different devices to access online resources such as search engines, shopping portals, entertainment providers, social networks, and mobile software applications. The particular device a consumer uses to access a particular online resource may depend on, for example, when the resource is accessed, where the consumer is located when accessing the resource, and the type of resource that is accessed. For instance, a consumer may prefer using a tablet computer to watch television shows, but may find the conventional keyboard of a laptop computer preferable when shopping online. Regardless of what motivates a consumer to use a particular device to access a particular online resource, the fact that the consumer uses multiple devices often makes it difficult to fully understand how the consumer interacts with different online resources. Another factor that adds to this difficulty is the increasing prevalence of public kiosks and the increasing tendency of consumers to share their devices with others, both of which provide an avenue whereby multiple consumers can share a single online access point. In particular, when multiple consumers share a single online access point it can be difficult to distinguish the activities of the consumers, thus making it difficult to understand how a particular consumer interacts with an online resource.

When a single consumer accesses an online resource using multiple devices, this will often frustrate efforts to understand the consumer's interactions with the online resource. For example, consider a consumer who clicks on a banner advertisement using a first device but later makes a purchase from a second device. This consumer will simultaneously appear both as an actively acquired consumer who failed to make a purchase, and as a passively acquired consumer who makes a purchase without seemingly having first viewed and selected any advertisement. An acquisition campaign associated with the advertisement will not be credited because the consumer's advertisement click cannot be linked to the subsequent purchase. In theory, such a link might exist if the consumer had identified himself/herself to both devices, for example by using both devices to log into the website where the purchase was consummated. However, as a practical matter, users often do not login, or may prefer not to create a login account. These structural and behavioral factors represent substantial obstacles to website administrators, campaign managers, application developers, and others who seek to better understand how users interact with online resources, and in particular, how users use multiple devices in the course of their online activities.

Various techniques have been proposed for identifying a user based on their digital interactions. In one example, clickstream data collected for unknown visitors is matched to profiles established for known visitor IDs using a term frequency analysis. More specifically, a clickstream is transformed into a query string based on extracted feature values, and the query string is applied to individual profiles to compute relevance scores and identify a matching profile. However, this technique cannot identify a new user from existing profiles. As such, this technique lacks the ability to adapt to new information. In another example, device and login identifiers are recorded for each digital interaction, and inferences can be drawn from the recorded data to identify devices operated by a single consumer. However, device and login identifiers may not always be available. Furthermore, privacy is increasingly important in digital interactions, and prior techniques fail to address anonymity when recording digital interaction data.

Accordingly, embodiments of the present invention are directed to techniques for identifying a user by performing a multi-class classification based on a digital interaction encoding. Generally, digital interactions of a user can reveal a pattern of digital behavior that can be detected and assigned to the user. An assumption can be made that this digital fingerprint will be unique (or nearly unique, with very high probability) for each user and will not change (or will change slowly). As such, a user can be uniquely identified by her digital fingerprint, and a classifier can be learned to identify that digital fingerprint.

More specifically, digital interaction data can be encoded and fed into a multi-class classifier (e.g., deep neural network, support vector machine, random forest, k-nearest neighbors, etc.), with each user corresponding to a different class. Various types of digital interaction data may be utilized, including device data (e.g., data or labels identifying an associated piece of hardware or software, such as a mobile device or a browser), geolocation data associated with a user device (e.g., latitude/longitude, geographic region, an associated tag such as nearby store or other business, etc.), clickstream data or other attributes of web traffic (e.g., selections, clicks, navigation actions, visits, pageviews, number of pageviews in the most recent visit, time spent on a website, revenue, etc.), and the like. Some embodiments provide anonymity by only utilizing behavioral-based user data as digital interaction data. As such, personally identifiable information such as name, age, address, IP address, cookies, and the like may be excluded.

Generally, the types of digital interaction data that are available for a particular digital interaction can depend on the device used by the user, the channel (e.g., a business unit within a company) with which the user interacts, and/or the venue (e.g., the company) with which the user interacts. Thus, different devices, channels, or venues could generate different digital interaction data that may or may not overlap with the digital interaction data generated by other devices, channels, or venues. The available digital interaction data may depend on sensors present in a device, a data collection schema, or otherwise. For example, if an incoming user appears on a smart phone, available digital interaction data may include geolocation data such as latitude, distance from a specific target (e.g., a particular store), and the like. On the other hand, if an incoming user appears on a desktop, geolocation data may not be available. Generally, missing digital interaction data can be addressed using a classification with missing values. Missing data can be substituted with zeros, matrix completion can be applied to fill in missing values, and/or a mask vector can be applied during backpropagation to avoid updating weights and biases based on missing values.

In embodiments in which the multi-class classifier is a deep neural network, new users can be detected and used to automatically grow the network to accommodate additional classes for the new users. For each incoming user to be identified, a corresponding digital interaction encoding can be fed into the deep neural network to compute activation values for each neuron in the output layer, and the neuron in the output layer with the strongest activation value is determined. If the strongest activation value exceeds a threshold activation number (e.g., 0.9), the incoming user can be positively identified as the user corresponding to the class for that neuron. Otherwise, the incoming user can be considered a new user, and the deep neural network can be automatically grown by adding a neuron to the output layer with new connections to each neuron in the preceding layer. In some embodiments, the deep neural network can be periodically and/or automatically retrained (e.g., every x new users, when a threshold percentage of new users to known users occurs, every y new digital interactions added to the training dataset, when a threshold percentage of new digital interactions to total digital interactions in the training dataset, etc.). When new users are added without retraining the network, weights and biases for only the new connections can be determined. In this manner, the network can autonomously add new classifications, while relying on its prior training to avoid the significant (and often unnecessary) computational costs that would otherwise be required to retrain the network for each new user.

As such, using implementations described herein, a classifier can be applied to efficiently and effectively identify a user based on digital interaction data, regardless of the device, channel, or venue through which the user interacts. The classifier can be trained to utilize only behavioral-based digital interaction data to protect user privacy. The classifier can automatically identify new users and periodically retrain itself, thereby avoiding a substantial expenditure of unnecessary computational resources, while providing the ability to adapt to new information.

Having briefly described an overview of aspects of the present invention, various terms used throughout this description are provided. Although more details regarding various terms are provided throughout this description, general descriptions of some terms are included below to provider a clearer understanding of the ideas disclosed herein:

A digital interaction, as used herein, refers to a digital encounter between a user and a device, channel, and/or venue. A digital interaction can include any number of transactions (e.g., user inputs).

As used herein, a venue refers to a digital infrastructure which collects digital interaction data. Generally, different venues may use different data collection schemas. For example, different companies may collect digital interaction data for the same user in different ways (e.g., using different ID numbers). As such, a user's digital interactions with different venues may not be attributed to the same user.

As used herein, a channel refers to any medium through which information may be collected about a user. In one example, a particular company may apply different data collection schemas in different scenarios (e.g., digital interactions with the company's website vs. physical interactions in the company's brick and mortar store). In another example, a company may apply different data collection schemas for different business units. Generally, a channel is the medium (whether digital or physical) through which a user interacts with a person, company, or other entity.

Digital interaction data, as used herein, refers to data quantifying or characterizing one or more aspects of one or more digital interactions. Digital interaction data can include any type of information about a digital interaction of a user, including device data (e.g., data or labels identifying an associated piece of hardware or software, such as a mobile device or a browser), geolocation data associated with a user device (e.g., latitude/longitude, geographic region, an associated tag such as one identifying a nearby store or other business, etc.), clickstream data or other attributes of web traffic (e.g., selections, clicks, navigation actions, visits, pageviews, number of pageviews in the most recent visit, time spent on a website, revenue, etc.), and the like. In some embodiments, digital interaction data does not include any personally identifiable information (e.g., name, age, address, IP address, cookies, etc.). Generally, digital interaction data can be used as evidence of a user's digital fingerprint.

A digital interaction encoding is a digital representation of digital interaction data for one or more digital interactions. Any suitable encoding technique may be used. For example, each distinct component of digital interaction data (e.g., number of pageviews in the most recent visit, time spent on a website, etc.) can be encoded into one or more corresponding dimensions of an encoding vector. In some embodiments, each distinct component of digital interaction data can be encoded into a single dimension (e.g., base 2, base 10, etc.) of an encoding vector.

A digital fingerprint, as used herein, refers to a pattern of digital behavior that can be detected and assigned to a user. Generally, an assumption can be made that each person's digital fingerprint will be unique (or nearly unique, with very high probability) and will not change (or will change slowly). As such, a person can be uniquely identified by their digital fingerprint.

A multi-class classification, as used herein, refers to a process in which an instance (e.g., a digital interaction) is classified into one of a plurality of classes (e.g. one class per known user). In some embodiments, the multi-class classification can be performed by a deep neural network. As used herein, a deep neural network refers to a neural network with multiple cascaded layers.

Example Digital User Identification System

Referring now to FIG. 1, a block diagram of example digital user identification system 100 suitable for use in implementing embodiments of the invention is shown. Generally, digital user identification system 100 is suitable for cross-device, cross-channel, and cross-venue user identification, and, among other things, facilitates digital identification of a user by performing a multi-class classification based on a digital interaction encoding. Among other components not shown, digital user identification system 100 may include any number of user devices 105A through 105N and any number of number of servers 120A through 120N. Any or all of user devices 105A through 105N, and any or all of servers 120A through 120N, can be any kind of computing device capable of facilitating user identification. For example, in an embodiment, user devices 105A through 105N and servers 120A through 120N are computing devices such as computing device 600, as described below with reference to FIG. 6. The components of digital user identification system 100 may communicate with each other via network 110, which may include, without limitation, one or more local area networks (LANs) and/or wide area networks (WANs). Such networking environments are commonplace in offices, enterprise-wide computer networks, intranets, and the Internet.

At a high level, each of servers 120A through 102N can collect, generate, or otherwise access digital interaction data for a user interacting with the server, and can identify the user, regardless of the device, channel, or venue through which the user interacts. In the embodiment illustrated in FIG. 1, each server 120A through 120N may include any number of interaction data components 130A through 130N, a user identification model 140, an adaptive modeling component 150, and a training dataset 160. Generally, interaction data components 130A through 130N can collect, generate, or otherwise access digital interaction data of digital interactions of users of client devices 105A through 105N, encode the digital interaction data into a digital interaction encodings, and store labeled digital interaction encodings in training dataset 160. User identification model 140 accesses a digital interaction encoding (e.g., from one of interaction data components 130A through 130N) and performs a multi-class classification based on the digital interaction encoding. In some embodiments, adaptive modeling component 150 accesses an output vector (e.g., softmax output) from the multi-class classification, identifies a classification from the output vector (e.g., a best classification) and identifies it as a positive classification when it satisfies a similarity threshold. Training dataset 160 stores labeled digital interaction encodings (e.g., from interaction data components 130A through 130N) and may be used to train user identification model 140.

Generally, a user operating any of user devices 105A through 105N may interact with any of servers 120A through 120N, for example, via a web browser or other application operable on or otherwise accessible via the user device. User devices 105A through 105N may take on any of a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, an AR/VR device, a workstation, any combination thereof, or any other suitable device.

In the embodiment illustrated in FIG. 1, any of servers 120A through 120N can collect, generate, or otherwise access digital interaction data based on digital interactions with client devices 105A through 105N. Any type of digital interaction data may be collected, generated, or otherwise accessed, including device data (e.g., data or labels identifying an associated piece of hardware or software, such as a mobile device or a browser), geolocation data associated with a user device (e.g., latitude/longitude, geographic region, an associated tag such as one identifying a nearby store or other business, etc.), clickstream data or other attributes of web traffic (e.g., selections, clicks, navigation actions, visits, pageviews, number of pageviews in the most recent visit, time spent on a website, revenue, etc.), and the like. It is contemplated in the present disclosure that different devices, channels, and venues may each collect, generate, or otherwise access different types of digital interaction data. As such, digital interaction data for one device, channel or venue may or may not overlap with digital interaction data for another device, channel, or venue. For example, a user may appear on user device 105A which only measures visits and pageview attributes of clickstream data or other attributes of web traffic but does not measure number of pageviews in the most recent visit or time spent on a website. As such, different digital interaction data may be collected, generated, or otherwise accessed by each device, channel, and/or venue.

Servers 120A through 120N may each correspond to different venues (e.g., different companies or entities). For example, in some embodiments, server 120A may be located in company A's digital infrastructure, and server 120N may be located in company N's digital infrastructure. As such, servers 120A through 120N may use different data collection schemas and may collect digital interaction data for the same user and/or client device in different ways (e.g., using different ID numbers, collecting different types of digital interaction data, etc.).

Further, in some embodiments, any or all of servers 120A through 120N may each include interaction data components 130A through 130N corresponding to different channels (e.g., business units within a company) in different venues (e.g., different companies). By way of nonlimiting example, server 120A may include interaction data component 130A which collects digital interaction data for business unit A of company A. Additionally, server 120A may include interaction data component 130N which collects digital interaction data for business unit N of company A. As such, interaction data components 130A through 130N may collect different data based on a corresponding venue, channel, and/or an assigned data collection schema.

In some embodiments, digital interaction data is collected, generated, or otherwise accessed by interaction data components 130A through 130N anonymously. In this regard, interaction data components 130A through 130N collect digital interaction data that does not contain personally identifiable information such as name, age, address, IP address, cookies, and the like. In other words, interaction data components 130A through 130N can collect, generate, or otherwise access only behavioral-based user data as digital interaction data. As such and as explained in more detail below, a user can be identified based only on behavioral-based information, thereby providing a measure of user identification to enable delivery of personalized services while keeping a user's privacy intact.

In some embodiments, an interaction data component (e.g., interaction data component 130A) can account for missing values of digital interaction data. Generally, digital interaction data can include missing values for any number of reasons. For example, a particular channel or venue may apply a designated data collection schema with aspects that are incompatible with a device interacting with the channel or venue. As a result, a particular digital interaction may include missing (e.g., null) values. An interaction data component can handle missing digital interaction data by replacing a missing value with a finite value or other finite placeholder (e.g., zeros, synthesized data, etc.). For example, missing digital interaction data can be replaced with zeros to facilitate identification of the user with a deep neural network. By way of nonlimiting example, if interaction data component 130A accesses digital interaction data for a digital interaction, and the digital interaction data does not specify the number of pageviews in the most recent visit or time spent on a website, the missing value may be substituted with the number 0. Additionally or alternatively, any suitable technique for synthesizing missing data may be implemented, including, by way of nonlimiting example, matrix completion.

Generally, any of servers 120A through 120N can perform a cross-device, cross-channel, and/or cross-venue user identification by performing a multi-class classification. That is to say, a user identification can be performed regardless of the device, channel, or venue through which the user interacts. To facilitate the classification, digital interaction data can be encoded (e.g., by interaction data component A) into a digital interaction encoding. Any suitable encoding technique may be used. For example, each distinct component of digital interaction data (e.g., number of pageviews in the most recent visit, time spent on a website, etc.) can be encoded into one or more corresponding dimensions of an encoding vector. In some embodiments, each distinct component of digital interaction data can be encoded into a single dimension (e.g., base 2, base 10, etc.) of an encoding vector. As such, the digital interaction encoding can be used as an input into a multi-class classifier (e.g., user identification model 140).

User identification model 140 identifies a user by performing a multi-class classification using a digital interaction encoding (e.g., from interaction data components 130A through 130N) as an input. User identification model 140 may be any suitable model, such as a deep neural network, support vector machine, random forest, k-nearest neighbors, and the like. By way of nonlimiting example, user identification model 140 may be a fully connected deep neural network with any number of hidden layers and a softmax classifier in the output layer. Although embodiments described herein focus on an implementation using a deep neural network, any suitable model may be applied. For example, user identification model 140 may be a support vector machine using a one-vs.-one strategy, a k-nearest neighbor classifier (e.g., applying a principal component analysis to uncorrelate potentially correlated input features), a random forest classifier (e.g., applying a principal component analysis), or otherwise.

Generally, user identification model 140 may be trained with any suitable training dataset or combination of datasets. For example, user identification model 140 may be trained with labeled digital interaction encodings stored in training dataset 160 (e.g., an existing labeled dataset, data collected from any or all interaction data components, synthetic data, etc.). Each label or class corresponds to a different known user (i.e., each established user for which digital interaction data exists), and each digital interaction encoding reflects digital interaction data for any number of digital interactions. In some embodiments, training dataset 160 can include a consolidated digital interaction per user. Digital interaction data for any or all digital interactions of a given user can be consolidated in any way (e.g., by taking the average, median, mode, or other suitable representation of the existing digital interaction data for the user), and this consolidated digital interaction data can be encoded into a single consolidated digital interaction encoding for the user.

As such, user identification model 140 may be trained using consolidated digital interaction encodings. In some embodiments, the training dataset excludes personally identifiable information (e.g. name, address, IP address, cookies, etc.) and labels users anonymously (e.g. by a unique identifier) such that user identification model 140 may be trained to identify users anonymously. The training dataset can include real and/or simulated (e.g. synthetic) data. For example, digital interaction data can be synthesized by randomly generating digital interactions around a desired mean in vector space and applying Gaussian noise. As such, user identification model 140 can be trained using training dataset 160 to identify a user based on a digital interaction encoding.

Additionally or alternatively to replacing missing values of digital interaction data in training dataset 160, a mask vector can be generated for a particular digital interaction (e.g., by interaction data component 130A) and applied during backpropagation to avoid updating weights and biases based on missing values. The mask vector is a vector of the same shape as a digital interaction encoding, but the mask vector contains only zeros and ones. A number one in the mask vector indicates the presence of data in the digital interaction encoding, while a zero indicates the absence of data. During training, a Kronecker delta function can be applied to the cost function to avoid updating weights and biases based on missing values in training data.

In some embodiments, new users (e.g., new classes) may be automatically identified using user identification model 140. For example, adaptive modeling component 150 can access an output vector generated by user identification model 140. In embodiments in which user identification model 140 is a deep neural network with a softmax classifier in the output layer, the output layer may comprise a plurality of neurons, one neuron per known user (class). Activating the deep neural network with a particular digital interaction encoding produces an activation number for each output neuron. The activation number of a particular output neuron identifies a likelihood the underlying digital interaction is with a known user (class) corresponding to the neuron. In this regard, adaptive modeling component 150 can identify a classification from the output vector by identifying a neuron from the output layer of the deep neural network with the strongest activation number. Adaptive modeling component 150 can determine whether the output vector generated by user identification model 140 satisfies a similarity threshold by applying a threshold activation number (e.g., 0.9) to the strongest activation number. An output that satisfies the similarity threshold can indicate a positive classification (e.g. as a known user). An output that does not satisfy the similarity threshold can indicate the digital interaction is for a new user (e.g. new class), and user identification model 140 can be automatically grown to identify the new class, as explained in more detail below. In either scenario, adaptive modeling component 150 may add the corresponding digital interaction data and/or the corresponding digital interaction encoding labeled with the classification to training dataset 160. In embodiments that involve consolidated digital interactions, for every positive classification identifying a new digital interaction for a previously known user, the consolidated digital interaction data and digital interaction encoding for that user can be re-computed using the new digital interaction data for the new digital interaction.

In embodiments in which a new user (new class) is identified, user identification model 140 may can be automatically adapted to accommodate the new class, and can be automatically and/or periodically retrained. For example, in embodiments in which user identification model 140 is a deep neural network, the deep neural network may be automatically grown by adding a dimension (e.g., a neuron) to the model (e.g., the output layer). Since digital interactions can be recorded in training dataset 160 (including those identified for new users) to generate an updated training dataset, user identification model 140 may be automatically and/or periodically retrained using the updated training dataset. For example, and as explained in more detail below, adaptive modeling component 150 may automatically retrain user identification model 140 (e.g., every x new users, when a threshold percentage of new users to known users occurs, every y new digital interactions added to the training dataset, when a threshold percentage of new digital interactions to total digital interactions in the training dataset, etc.). Accordingly, user identification model 140 can be automatically adapted to handle new classifications, while relying on its prior training between retraining sessions to avoid the significant (and often unnecessary) computational costs that would otherwise be required to retrain the network for each new user. In the case of new digital interactions by previously known users, as new information is added to the training dataset (and, by implication, the digital fingerprints and/or behavioral patterns of known users), user identification model 140 can be automatically adapted to reflect the new information.

Accordingly, user identification model 140 may perform a multi-class classification to the user associated with a particular digital interaction. This output prediction can be provided to various service providers (whether or not associated with the operator of the model), for example, to deliver personalized services and/or for various data analytics purposes. By way of nonlimiting examples, an output prediction can be used to tailor content delivery or advertisements for a predicted user, to associate a purchase or other revenue generation event (e.g., banner clicks) with other digital interactions from the same user, to associate views or some other metric with a particular digital campaign (e.g., marketing, advertising, etc.) delivered across multiple digital interactions, to avoid counting redundant digital interactions for the same user, and otherwise. These and other uses will be understood by those of ordinary skill in the art. Updating the user identification model to reflect new digital interactions and historical digital interactions for a given user produces a more comprehensive model of user behavior. As a result, the process of identifying a particular user becomes more accurate, and the downstream uses of a user identification become more effective.

Example Flow Diagrams

Figure 2:
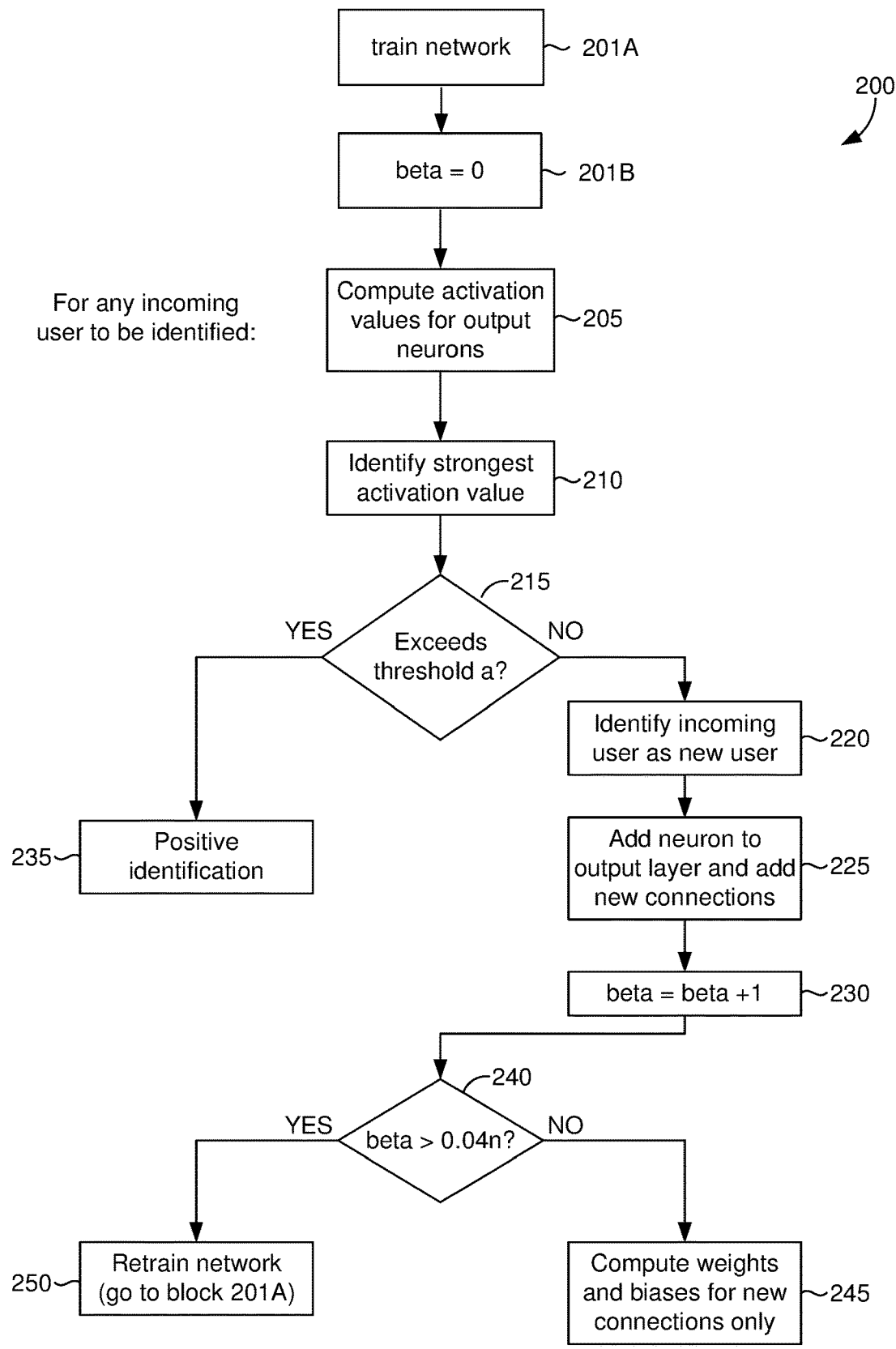
FIG. 2 is a flow diagram showing a method for periodically retraining a deep neural network to identify a user based on a digital interaction encoding, in accordance with embodiments of the present invention.
Figure 3:
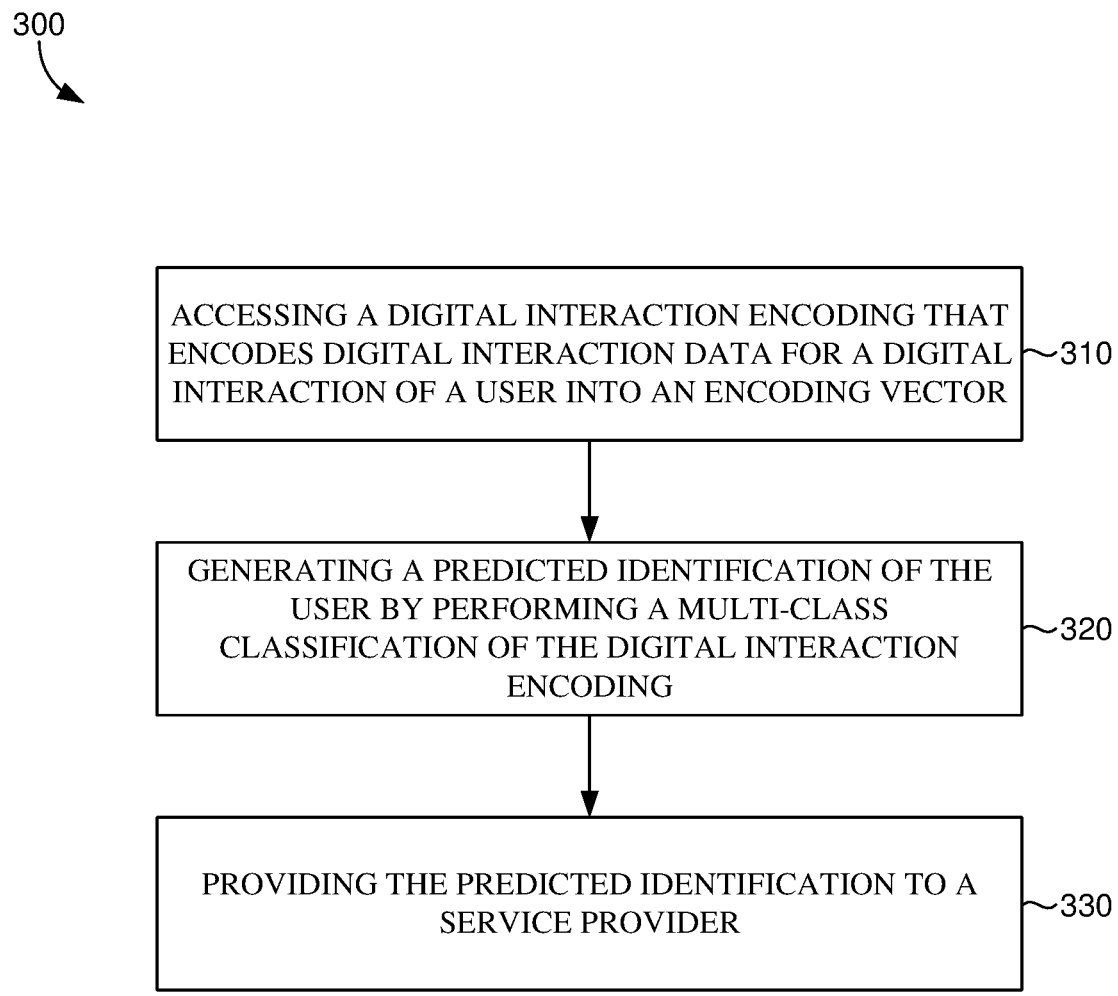
FIG. 3 is a flow diagram showing a method for digital user identification system, in accordance with embodiments of the present invention.
Figure 4:
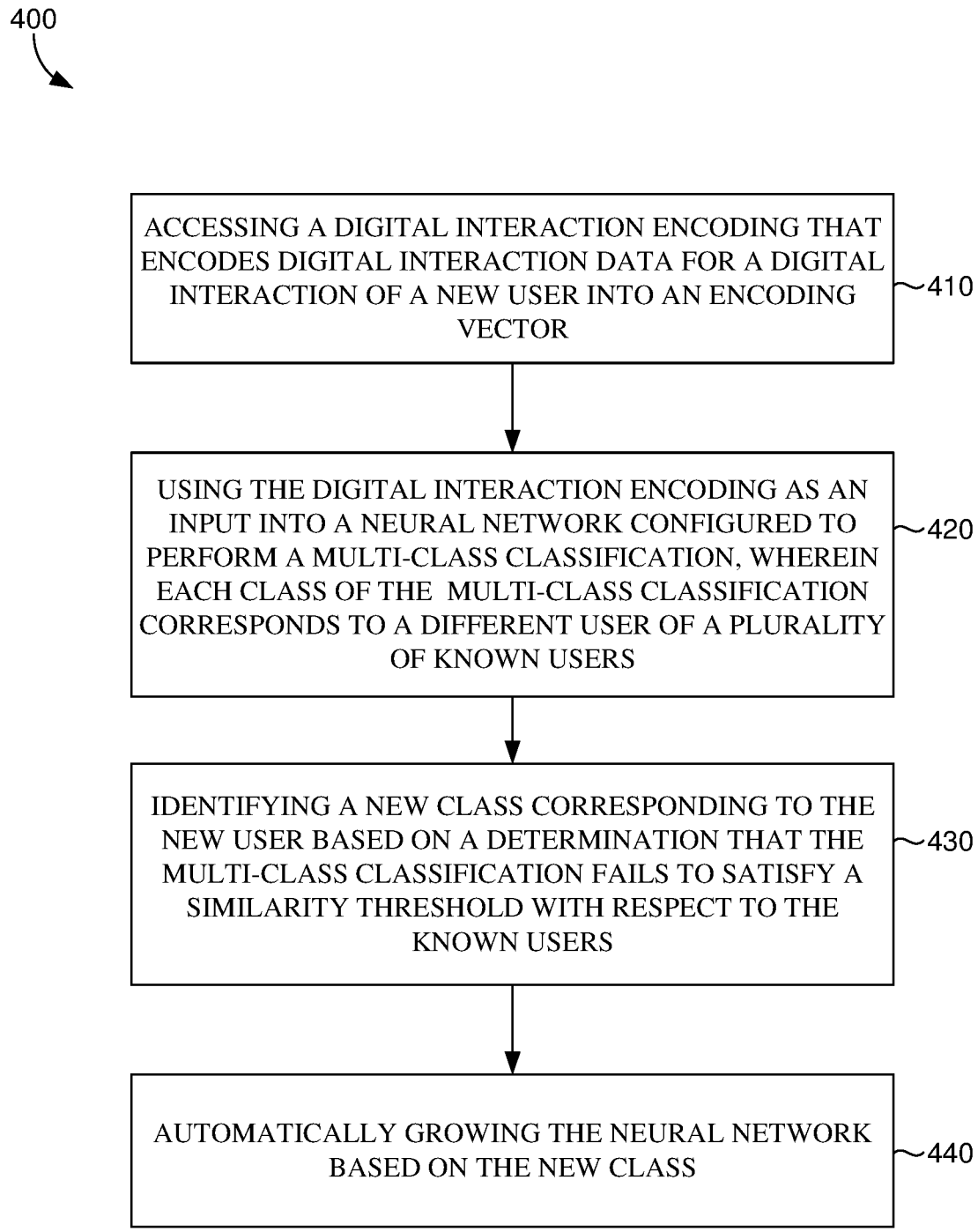
FIG. 4 is a flow diagram showing a method for periodically retraining a deep neural network to identify a user based on a digital interaction encoding, in accordance with embodiments of the present invention.

With reference now to FIGS. 2-4, flow diagrams are provided illustrating methods relating to digital user identification. Each block of the methods 200, 300 and 400 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 2, FIG. 2 illustrates a method 200 for periodically retraining a deep neural network to identify users based on digital interaction encodings, in accordance with embodiments described herein. In embodiments in which user identification model 140 of FIG. 1 is a deep neural network, FIG. 2 illustrates a method 200 in which user identification model 140 can be trained, operated, and periodically retrained. Generally, blocks 201A and 201B occur when training a deep neural network. Initially, a particular training dataset (e.g., training dataset 160), can include a number of known users. In the embodiment illustrated in FIG. 2, a deep neural network can be initiated with any number of hidden layers, and with a number of output neurons in the output layer (i.e., the number of classes) equal to the number of known users. At block 201A, the deep neural network can be trained with the training dataset to identify a user from a digital interaction encoding. For example, a desired threshold activation number a (or some other threshold of accuracy) may be specified for an output neuron in the output layer to signify a positive classification for a corresponding class (known user), and backpropagation can be applied to compute optimal values of weights and biases for the deep neural network based on the threshold activation number a. Generally, the training can occur automatically (e.g., initiated and controlled by adaptive modeling component 150 of FIG. 1), as will be understood by those of ordinary skill in the art.

In some embodiments, the deep neural network may be retrained periodically (e.g., at some time interval, whether regular or not, upon the occurrence of some detected event, or otherwise). For example, and as explained in more detail below, inspection of activation values for the neurons in the output layer can be used to identify a previously unknown user (a new class) and to trigger an automatic expansion of the deep neural network to accommodate the new user. To avoid the significant (and often unnecessary) computational costs that would otherwise be required to retrain the network for each new user, a counter beta can be incremented for every new user added to the network (block 230), the deep neural network may rely on its prior training under certain circumstances (e.g., blocks 240-250), and when the deep neural network is retrained (block 201A), the counter beta can be reset to zero (block 201B). As such, in these embodiments, blocks 201A and 201B occur each time the deep neural network is trained. The particular technique illustrated in FIG. 2 involving the use of a counter and particular threshold counter values is simply meant as an example process for periodically retraining a deep neural network, and any number of variations may be implemented (e.g., retrain every x new users, when a threshold percentage of new users to known users occurs, every y new digital interactions added to the training dataset, when a threshold percentage of new digital interactions to total digital interactions in the training dataset, on a particular time interval, at a scheduled time such as an off-peak time, etc.).

Continuing now with FIG. 2, blocks 205-250 illustrate a method for identifying an incoming user based on a digital interaction encoding, in accordance with embodiments described herein. In the embodiment illustrated in FIG. 2, each time a user is to be identified (e.g., a corresponding digital interaction occurs), user identification can begin at block 205. At block 205, a digital interaction data encoding (e.g., generated by one of interaction data components 130A through 130N of FIG. 1) is fed as an input into the deep neural network trained in block 201A, and activation values for each output neuron in the output layer of the network are computed. At block 210, the strongest activation value of the output neurons is identified. At block 215, a determination is made whether the strongest activation value identified at block 210 exceeds the threshold activation number a. When the strongest activation value does not exceed the threshold activation number a, the incoming user is identified as a new user at block 220. At block 225, a neuron is added to the output layer of the deep neural network to accommodate the new user (new class), and at block 225, new connections are added between the new neuron and each neuron in the previous layer of the network. At block 230, the counter beta is incremented (e.g. beta=beta+1). On the other hand, when the strongest activation value does exceed the threshold activation number a, at block 235, the incoming user is positively identified as the user (class) corresponding to the output neuron with the highest activation value. At block 240, a determination is made whether the counter beta exceeds an applicable threshold. In the embodiment illustrated in FIG. 2, the threshold applied is 4% of the known users n (classes) in the training dataset used for the previous training iteration (e.g. beta>0.04 n), however, any threshold may be applied (e.g., a number of new users, a percentage of new users to known users, etc.). When the counter beta does not exceed the applicable threshold, at block 245, weights and biases are computed for only the new connections added at block 225. In this manner, the network can autonomously add new classifications, while relying on its prior training to avoid the significant (and often unnecessary) computational costs that would otherwise be required to retrain the network for each new user. When the counter beta exceeds the applicable threshold, the network can be retrained at block 250 by returning to block 201A. By avoiding retraining every time the network is grown to accommodate a new user/class, a significant amount of computation time and resources are saved.

Turning now to FIG. 3, FIG. 3 depicts a method 300 for digital user identification system. Initially at block 310, a digital interaction encoding is accessed that encodes digital interaction data for a digital interaction(s) of a user into an encoding vector. Digital interaction data can include any type of information about a digital interaction of a user, including device data, geolocation data associated with a user device, clickstream data or other attributes of web traffic, and the like. In some embodiments, digital interaction data does not include any personally identifiable information. Any suitable encoding technique may be used to generate a digital interaction encoding from digital interaction data. For example, each distinct component of digital interaction data (e.g., number of pageviews in the most recent visit, time spent on a website, etc.) can be encoded into one or more corresponding dimensions of an encoding vector. At block 320, a predicted identification of the user is generated by performing a multi-class classification of the digital interaction encoding. For example, a deep neural network may be used to identify the user as a new user based on a determination that the multi-class classification fails to satisfy a similarity threshold with respect to the known users, and the deep neural network may be automatically grown to accommodate a new class corresponding to the new user. At block 330, the predicted identification is provided to a service provider.

Turning now to FIG. 4, FIG. 4 depicts a method 400 for periodically retraining a deep neural network to identify a user based on a digital interaction encoding. Initially at block 410, a digital interaction encoding that encodes digital interaction data for a digital interaction of a new user (e.g., not in the training dataset used for a previous training iteration) into an encoding vector is accessed. At block 420, the digital interaction encoding is used as an input into a deep neural network configured to perform a multi-class classification. Each class of the multi-class classification corresponds to a different user of a plurality of known users. At block 430, a new class corresponding to the new user is identified based on a determination that the multi-class classification fails to satisfy a similarity threshold with respect to the known users. At block 440, the deep neural network automatically grows based on the new class. Automatically growing the deep neural network may include adding a neuron to the output layer of the deep neural network and adding a new connection between the added neuron and each neuron in a previous layer of the deep neural network.

Exemplary Computing Environment

Figure 5:
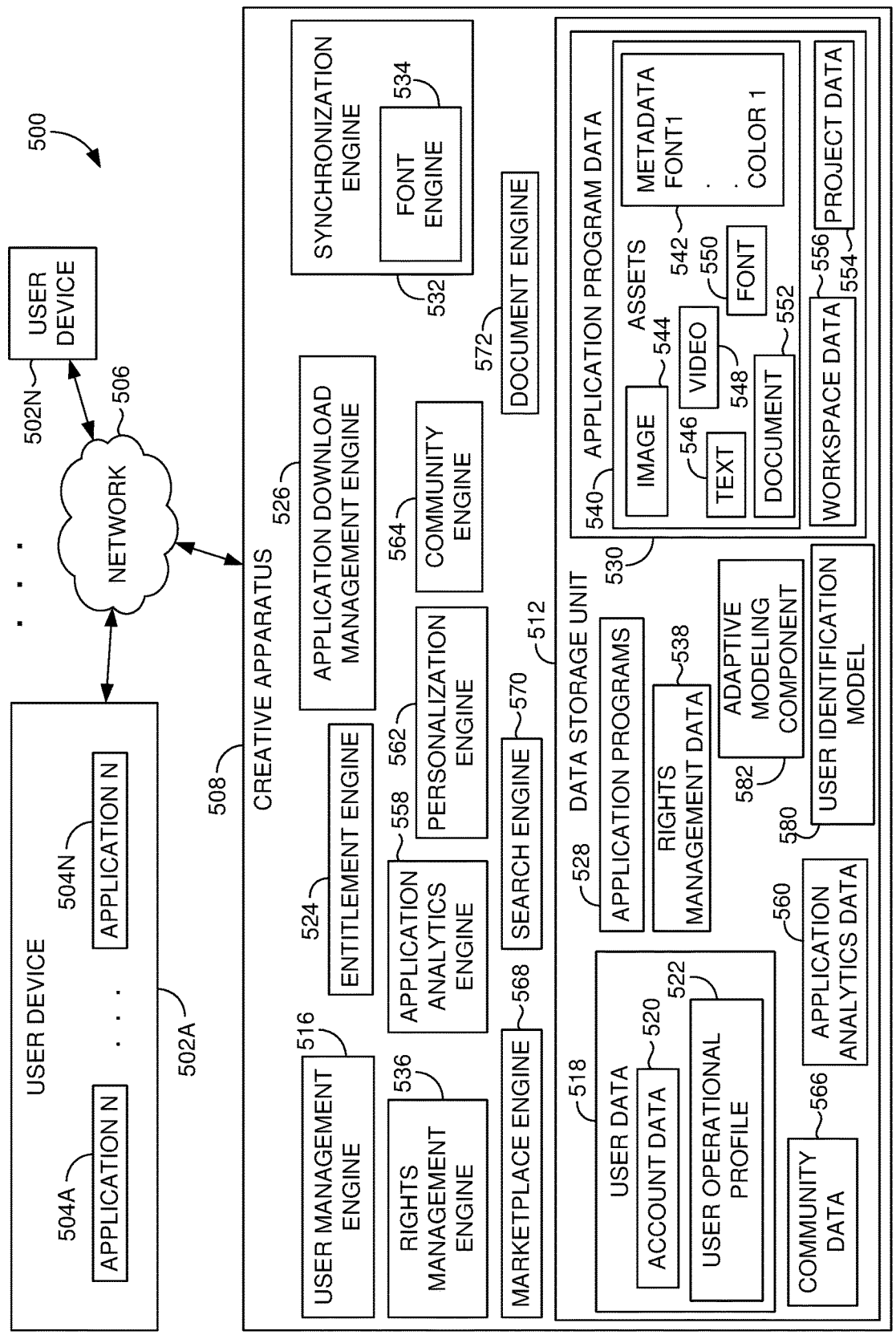
FIG. 5 is a block diagram of an exemplary computing environment in which embodiments of the invention may be employed.

FIG. 5 is a diagram of environment 500 in which one or more embodiments of the present disclosure can be practiced. Environment 500 includes one or more user devices, such as user devices 502A-502N. Examples of user devices include, but are not limited to, a personal computer (PC), tablet computer, a desktop computer, cellular telephone, a processing unit, any combination of these devices, or any other suitable device having one or more processors. Each user device includes at least one application supported by creative apparatus 508. It is to be appreciated that following description may generally refer to user device 502A as an example and any other user device can be used.

A user of the user device can utilize various products, applications, or services supported by creative apparatus 508 via network 506. User devices 502A-502N can be operated by various users. Examples of the users include, but are not limited to, creative professionals or hobbyists who use creative tools to generate, edit, track, or manage creative content, advertisers, publishers, developers, content owners, content managers, content creators, content viewers, content consumers, designers, editors, any combination of these users, or any other user who uses digital tools to create, edit, track, or manage digital experiences.

A digital tool, as described herein, includes a tool that is used for performing a function or a workflow electronically. Examples of a digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. A digital tool includes creative apparatus 508.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

User devices 502A-502N can be connected to creative apparatus 508 via network 506. Examples of network 506 include, but are not limited to, internet, local area network (LAN), wireless area network, wired area network, wide area network, and the like.

Creative apparatus 508 includes one or more engines for providing one or more digital experiences to the user. Creative apparatus 508 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. Creative apparatus 508 also includes data storage unit 512. Data storage unit 512 can be implemented as one or more databases or one or more data servers. Data storage unit 512 includes data that is used by the engines of creative apparatus 508.

A user of user device 502A visits a webpage or an application store to explore applications supported by creative apparatus 508. Creative apparatus 508 provides the applications as a software as a service (SaaS), or as a standalone application that can be installed on user device 502A, or as a combination. The user can create an account with creative apparatus 508 by providing user details and also by creating login details. Alternatively, creative apparatus 508 can automatically create login details for the user in response to receipt of the user details. In some embodiments, the user is also prompted to install an application manager. The application manager enables the user to manage installation of various applications supported by creative apparatus 508 and also to manage other functionalities, such as updates, subscription account and the like, associated with the applications. User details are received by user management engine 516 and stored as user data 518 in data storage unit 512. In some embodiments, user data 518 further includes account data 520 under which the user details are stored.

The user can either opt for a trial account or can make payment based on type of account or subscription chosen by the user. Alternatively, the payment can be based on product or number of products chosen by the user. Based on payment details of the user, user operational profile 522 is generated by entitlement engine 524. User operational profile 522 is stored in data storage unit 512 and indicates entitlement of the user to various products or services. User operational profile 522 also indicates type of user, i.e. free, trial, student, discounted, or paid.

In some embodiment, user management engine 516 and entitlement engine 524 can be one single engine performing the functionalities of both the engines.

The user can then install various applications supported by creative apparatus 508 via an application download management engine 526. Application installers or application programs 528 present in data storage unit 512 are fetched by application download management engine 526 and made available to the user directly or via the application manager. In one embodiment, an indication of all application programs 528 are fetched and provided to the user via an interface of the application manager. In another embodiment, an indication of application programs 528 for which the user is eligible based on user's operational profile are displayed to the user. The user then selects application programs 528 or the applications that the user wants to download. Application programs 528 are then downloaded on user device 502A by the application manager via the application download management engine 526. Corresponding data regarding the download is also updated in user operational profile 522. Application program 528 is an example of the digital tool. Application download management engine 526 also manages the process of providing updates to user device 502A.

Upon download, installation and launching of an application program, in one embodiment, the user is asked to provide the login details. A check is again made by user management engine 516 and entitlement engine 524 to ensure that the user is entitled to use the application program. In another embodiment, direct access is provided to the application program as the user is already logged into the application manager.

The user uses one or more application programs 504A-504N installed on the user device to create one or more projects or assets. In addition, the user also has a workspace within each application program. The workspace, as described herein, includes setting of the application program, setting of tools or setting of user interface provided by the application program, and any other setting or properties specific to the application program. Each user can have a workspace. The workspace, the projects, and/or the assets can be stored as application program data 530 in data storage unit 512 by synchronization engine 532. Alternatively or additionally, such data can be stored at the user device, such as user device 502A.

Application program data 530 includes one or more assets 540. Assets 540 can be a shared asset which the user wants to share with other users or which the user wants to offer on a marketplace. Assets 540 can also be shared across multiple application programs 528. Each asset includes metadata 542. Examples of metadata 542 include, but are not limited to, font, color, size, shape, coordinate, a combination of any of these, and the like. In addition, in one embodiment, each asset also includes a file. Examples of the file include, but are not limited to, image 544, text 546, video 548, font 550, document 552, a combination of any of these, and the like. In another embodiment, an asset only includes metadata 542.

Application program data 530 also include project data 554 and workspace data 556. In one embodiment, project data 554 includes assets 540. In another embodiment, assets 540 are standalone assets. Similarly, workspace data 556 can be part of project data 554 in one embodiment while it may be standalone data in other embodiment.

A user can operate one or more user device to access data. In this regard, application program data 530 is accessible by a user from any device, including a device which was not used to create assets 540. This is achieved by synchronization engine 532 that stores application program data 530 in data storage unit 512 and enables application program data 530 to be available for access by the user or other users via any device. Before accessing application program data 530 by the user from any other device or by any other user, the user or the other user may need to provide login details for authentication if not already logged in. In some cases, if the user or the other user are logged in, then a newly created asset or updates to application program data 530 are provided in real time. Rights management engine 536 is also called to determine whether the newly created asset or the updates can be provided to the other user or not. Workspace data 556 enables synchronization engine 532 to provide a same workspace configuration to the user on any other device or to the other user based on rights management data 538.

In various embodiments, various types of synchronization can be achieved. For example, the user can pick a font or a color from user device 502A using a first application program and can use the font or the color in a second application program on any other device. If the user shares the font or the color with other users, then the other users can also use the font or the color. Such synchronization generally happens in real time. Similarly, synchronization of any type of application program data 530 can be performed.

In some embodiments, user interaction with applications 504 is tracked by application analytics engine 558 and stored as application analytics data 560. Application analytics data 560 includes, for example, usage of a tool, usage of a feature, usage of a workflow, usage of assets 540, and the like. Application analytics data 560 can include the usage data on a per user basis and can also include the usage data on a per tool basis or per feature basis or per workflow basis or any other basis. Application analytics engine 558 embeds a piece of code in applications 504 that enables the application to collect the usage data and send it to application analytics engine 558. Application analytics engine 558 stores the usage data as application analytics data 560 and processes application analytics data 560 to draw meaningful output. For example, application analytics engine 558 can draw an output that the user uses "Tool 4" a maximum number of times. The output of application analytics engine 558 is used by personalization engine 562 to personalize a tool menu for the user to show "Tool 4" on top. Other types of personalization can also be performed based on application analytics data 560. In addition, personalization engine 562 can also use workspace data 556 or user data 518 including user preferences to personalize one or more application programs 528 for the user.

In some embodiments, application analytics data 560 includes data indicating status of a project of the user. For example, if the user was preparing an article in a digital publishing application and what was left was publishing the prepared article at the time the user quit the digital publishing application, then application analytics engine 558 tracks the state. Now when the user next opens the digital publishing application on another device, then the user is indicated and the state and options are provided to the user for publishing using the digital publishing application or any other application. In addition, while preparing the article, a recommendation can also be made by synchronization engine 532 to incorporate some of other assets saved by the user and relevant for the article. Such a recommendation can be generated using one or more engines, as described herein.

Creative apparatus 508 also includes community engine 564 which enables creation of various communities and collaboration among the communities. A community, as described herein, includes a group of users that share at least one common interest. The community can be closed, i.e., limited to a number of users or can be open, i.e., anyone can participate. The community enables the users to share each other's work and comment or like each other's work. The work includes application program data 530. Community engine 564 stores any data corresponding to the community, such as work shared on the community and comments or likes received for the work as community data 566. Community data 566 also includes notification data and is used for notifying other users by the community engine in case of any activity related to the work or new work being shared. Community engine 564 works in conjunction with synchronization engine 532 to provide collaborative workflows to the user. For example, the user can create an image and can request for some expert opinion or expert editing. An expert user can then either edit the image as per the user liking or can provide expert opinion. The editing and providing of the expert opinion by the expert is enabled using community engine 564 and synchronization engine 532. In collaborative workflows, a plurality of users is assigned different tasks related to the work.

Creative apparatus 508 also includes marketplace engine 568 for providing marketplace to one or more users. Marketplace engine 568 enables the user to offer an asset for selling or using. Marketplace engine 568 has access to assets 540 that the user wants to offer on the marketplace. Creative apparatus 508 also includes search engine 570 to enable searching of assets 540 in the marketplace. Search engine 570 is also a part of one or more application programs 528 to enable the user to perform search for assets 540 or any other type of application program data 530. Search engine 570 can perform a search for an asset using metadata 542 or the file.

Creative apparatus 508 also includes document engine 572 for providing various document related workflows, including electronic or digital signature workflows, to the user. Document engine 572 can store documents as assets 540 in data storage unit 512 or can maintain a separate document repository (not shown in FIG. 5).

In accordance with embodiments of the present invention, data storage unit 512 includes user identification model 580 that can predict a user identification based on a digital interaction encoding that encodes digital interaction data for a digital interaction of a user. The digital interaction may occur via one of user device 502A through 502N. Further, data storage unit 512 may include adaptive modeling component 582, which can automatically grow user identification model 580 to accommodate new detected classes (new users). This configuration is merely exemplary, and other variations for software functionality that performs digital user identification are contemplated within the present disclosure.

It is to be appreciated that the engines and working of the engines are described as examples herein, and the engines can be used for performing any step in providing digital experience to the user.

Exemplary Operating Environment

Figure 6:
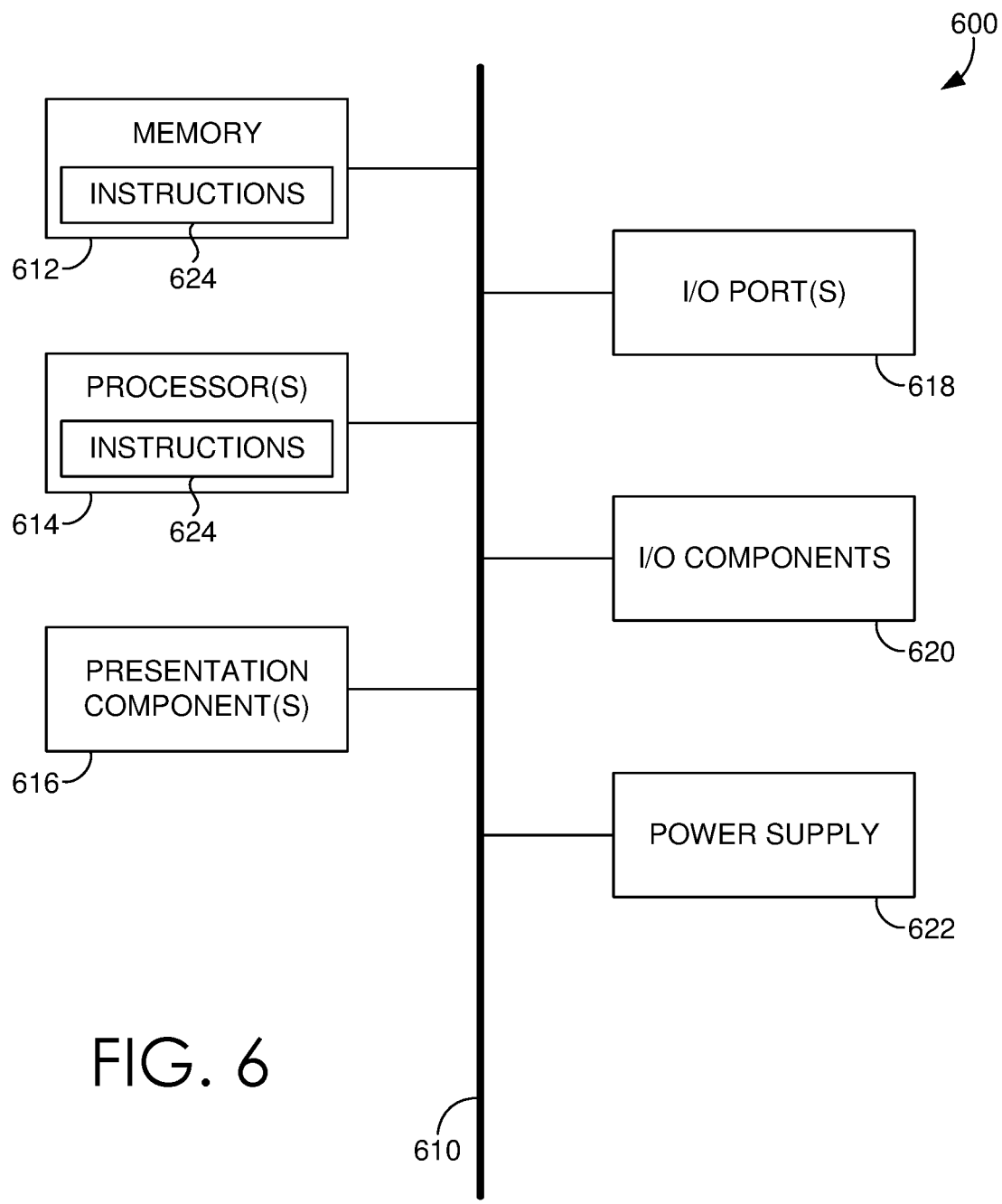
FIG. 6 is a block diagram of an exemplary computing environment suitable for use in implementing embodiments of the present invention.

Having described an overview of embodiments of the present invention, an exemplary operating environment in which embodiments of the present invention may be implemented is described below in order to provide a general context for various aspects of the present invention. Referring now to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 600. Computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of computing device 600 to render immersive augmented reality or virtual reality.

Embodiments described herein support digital user identification. The components described herein refer to integrated components of a digital user identification system. The integrated components refer to the hardware architecture and software framework that support functionality using the digital user identification system. The hardware architecture refers to physical components and interrelationships thereof and the software framework refers to software providing functionality that can be implemented with hardware embodied on a device.

The end-to-end software-based digital user identification system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for the system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   accessing a digital interaction encoding that encodes digital interaction data for a digital interaction of a user into an encoding vector;
   generating a predicted identification of the user by performing a multi-class classification of the digital interaction encoding with a deep neural network, a support vector machine, a random forest classifier, or a k-nearest neighbor classifier; and
   providing the predicted identification.

2. The computer storage media of claim 1, wherein the digital interaction data comprises only behavior-based data and the predicted identification of the user is anonymous.

3. The computer storage media of claim 1, wherein each class of the multi-class classification corresponds to a different user of a plurality of known users, wherein generating the predicted identification comprises:
   identifying, with the deep neural network, the user as a new user based on a determination that the multi-class classification fails to satisfy a similarity threshold with respect to the known users; and
   automatically growing the deep neural network to accommodate a new class corresponding to the new user.

4. The computer storage media of claim 3, wherein automatically growing the deep neural network comprises adding a neuron to an output layer of the deep neural network.

5. The computer storage media of claim 3, the operations further comprising automatically retraining, based on a number of detected new classes, a multi-class classifier performing the multi-class classification.

6. The computer storage media of claim 1, wherein the digital interaction data comprises finite values that replace missing values.

7. The computer storage media of claim 1, wherein performing the multi-class classification of the digital interaction encoding is with the deep neural network.

8. A computerized method for digital user identification, the method comprising:
   accessing a digital interaction encoding that encodes digital interaction data for a digital interaction of a new user into an encoding vector;
   using the digital interaction encoding as an input into a deep neural network configured to perform a multi-class classification, wherein each class of the multi-class classification corresponds to a different user of a plurality of known users;
   identifying a new class corresponding to the new user based on a determination that the multi-class classification fails to satisfy a similarity threshold with respect to the known users; and
   automatically growing the deep neural network based on the new class.

9. The computerized method of claim 8, wherein the digital interaction data comprises only behavior-based data.

10. The computerized method of claim 8, wherein the determination that the multi-class classification fails to satisfy the similarity threshold comprises:
    identifying a neuron from an output layer of the deep neural network with a strongest activation number; and
    determining that the strongest activation number is below an activation threshold.

11. The computerized method of claim 8, wherein automatically growing the deep neural network comprises:
    adding a neuron to an output layer of the deep neural network; and
    adding a new connection between the added neuron and each neuron in a previous layer of the deep neural network.

12. The computerized method of claim 11, wherein the deep neural network is automatically retrained based on at least one of a number of new classes or a number of new digital interactions detected since a prior training of the deep neural network.

13. The computerized method of claim 11, wherein the deep neural network is automatically retrained based on a threshold percentage of at least one of detected new users or detected new digital interactions to the known users.

14. The computerized method of claim 8, wherein the digital interaction data comprises finite values that replace missing values.

15. A computer system comprising:
    one or more hardware processors and memory configured to provide computer program instructions to the one or more hardware processors; and
    a means for generating a predicted identification of a user by using the one or more hardware processors to perform a multi-class classification, with a deep neural network, a support vector machine, a random forest classifier, or a k-nearest neighbor classifier, based on a digital interaction encoding that encodes digital interaction data for a digital interaction of the user into an encoding vector.

16. The computer system of claim 15, wherein the digital interaction data comprises only behavior-based data and the predicted identification of the user is anonymous.

17. The computer system of claim 15, wherein each class of the multi-class classification corresponds to a different user of a plurality of known users, wherein the means for generating the predicted identification is configured to:
  identify the user as a new user based on a determination that the multi-class classification fails to satisfy a similarity threshold with respect to the known users; and
  automatically grow to accommodate a new class corresponding to the new user.

18. The computer system of claim 17, wherein the means for generating the predicted identification is configured to automatically grow by adding a neuron.

19. The computer system of claim 17, further comprising an adaptive modeling component configured to utilize the one or more hardware processors to automatically retrain the means for generating the predicted identification based on a number of detected new classes.

20. The computer system of claim 15, wherein the digital interaction data comprises finite values that replace missing values.

* * * * *